United States Patent
Yoon

(10) Patent No.: US 10,960,537 B2
(45) Date of Patent: Mar. 30, 2021

(54) ROBOT ARM MECHANISM

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 55 days.

(21) Appl. No.: 15/499,262

(22) Filed: Apr. 27, 2017

(65) Prior Publication Data

US 2017/0225325 A1  Aug. 10, 2017

Related U.S. Application Data

(63) Continuation of application No. PCT/JP2015/080180, filed on Oct. 27, 2015.

(30) Foreign Application Priority Data

Oct. 30, 2014 (JP) .............................. JP2014-222090

(51) Int. Cl.
*B25J 9/04* (2006.01)
*B25J 18/02* (2006.01)
(Continued)

(52) U.S. Cl.
CPC ................. *B25J 9/045* (2013.01); *B25J 9/06* (2013.01); *B25J 17/00* (2013.01); *B25J 18/02* (2013.01); *B25J 18/025* (2013.01); *B25J 18/04* (2013.01)

(58) Field of Classification Search
CPC ... B25J 18/025; B25J 18/04; B25J 9/04; B25J 9/044; B25J 9/045; B25J 9/047; B25J 9/06; B25J 9/046
(Continued)

(56) References Cited

U.S. PATENT DOCUMENTS 3,784,031 A * 1/1974 Niitu ...................... A63H 31/00
414/735
3,916,701 A * 11/1975 Butler ...................... B25J 9/045
74/57

(Continued)

FOREIGN PATENT DOCUMENTS

CN 1411420 A 4/2003
CN 102637158 A 8/2012
(Continued)

OTHER PUBLICATIONS

Woo-Keun Yoon et al., "Realtime control of a Robotic Arm for Person with Upper-limb Disabilities (RAPUDA)", Dai 28 Kai Annual Conference of the Robotics Society of Japan Yokoshu DVD-ROM, Sep. 22, 2010 (Sep. 22, 2010), p. 1.

*Primary Examiner* — Joseph Brown
(74) *Attorney, Agent, or Firm* — Nakanishi IP Associates, LLC

(57) ABSTRACT

A robot arm mechanism capable of structurally eliminating or reducing a singular point posture within a movable range has a plurality of joints. The first joint is a rotational joint that rotates on a first axis, a second joint is a rotational joint that rotates on a second axis, and a third joint is a linear motion joint that moves along a third axis. The first joint, the second joint and the third joint are arranged in order from a base. The first joint is arranged so that the first axis is perpendicular to the base. The second joint is offset with respect to the first joint in a direction (Z axis direction) of the first axis and a direction (Y axis direction) perpendicular to the first axis.

2 Claims, 17 Drawing Sheets

(51) Int. Cl.
  *B25J 9/06* (2006.01)
  *B25J 17/00* (2006.01)
  *B25J 18/04* (2006.01)

(58) Field of Classification Search
  USPC .......................................... 74/490.01, 490.05
  See application file for complete search history.

(56) References Cited

U.S. PATENT DOCUMENTS

| | | | | |
|---|---|---|---|---|
| 4,547,119 | A * | 10/1985 | Chance | B25J 9/045 |
| | | | | 414/690 |
| 5,267,483 | A * | 12/1993 | Torii | B25J 9/02 |
| | | | | 74/490.01 |
| 8,621,954 | B1 * | 1/2014 | Dellon | 74/490.01 |
| 8,709,000 | B2 * | 4/2014 | Madhani | A61B 17/00234 |
| | | | | 606/1 |
| 2005/0011294 | A1 | 1/2005 | Hashimoto et al. | |
| 2012/0011956 | A1 * | 1/2012 | Lundberg | B25J 9/04 |
| | | | | 74/490.03 |
| 2012/0024091 | A1 * | 2/2012 | Kawabuchi | B25J 9/045 |
| | | | | 74/37 |
| 2013/0060383 | A1 * | 3/2013 | Jeong | B25J 9/045 |
| | | | | 700/261 |
| 2013/0068061 | A1 * | 3/2013 | Yoon | B25J 18/025 |
| | | | | 74/490.05 |
| 2013/0174683 | A1 * | 7/2013 | Roberts | B25J 18/00 |
| | | | | 74/490.03 |
| 2016/0375591 | A1 * | 12/2016 | Yoon | B25J 18/025 |
| | | | | 74/490.05 |
| 2017/0225324 | A1 * | 8/2017 | Yoon | B25J 9/06 |
| 2017/0225327 | A1 * | 8/2017 | Yoon | H02P 8/38 |
| 2017/0259430 | A1 * | 9/2017 | Yoon | B25J 9/10 |
| 2017/0259435 | A1 * | 9/2017 | Yoon | B25J 13/00 |
| 2017/0266819 | A1 * | 9/2017 | Yoon | B25J 18/02 |
| 2017/0282376 | A1 * | 10/2017 | Yoon | B25J 18/02 |
| 2017/0291309 | A1 * | 10/2017 | Yoon | B25J 18/02 |
| 2017/0291310 | A1 * | 10/2017 | Yoon | B25J 18/02 |
| 2017/0291311 | A1 * | 10/2017 | Yoon | B25J 18/02 |
| 2017/0297205 | A1 * | 10/2017 | Takase | B25J 18/02 |
| 2017/0297209 | A1 * | 10/2017 | Yoon | B25J 18/02 |
| 2017/0320217 | A1 * | 11/2017 | Yoon | B25J 18/02 |
| 2017/0320218 | A1 * | 11/2017 | Yoon | B25J 18/02 |
| 2017/0326735 | A1 * | 11/2017 | Yoon | B25J 15/0028 |
| 2018/0079077 | A1 * | 3/2018 | Yoon | B25J 13/00 |
| 2018/0093383 | A1 * | 4/2018 | Yoon | B25J 18/02 |
| 2018/0099422 | A1 * | 4/2018 | Yoon | B25J 19/06 |
| 2018/0207803 | A1 * | 7/2018 | Takase | B25J 13/02 |
| 2018/0207812 | A1 * | 7/2018 | Yoon | B25J 18/02 |
| 2018/0272544 | A1 * | 9/2018 | Yoon | F16G 13/20 |

FOREIGN PATENT DOCUMENTS

| | | |
|---|---|---|
| EP | 1 498 228 A1 | 1/2005 |
| JP | H02-219377 A | 8/1990 |
| JP | 4-25385 A | 1/1992 |
| JP | 04025385 A * | 1/1992 |
| JP | 5-220681 A | 8/1993 |
| JP | 07-108477 | 4/1995 |
| JP | 2003-019682 A | 1/2003 |
| JP | 2003-527737 A | 9/2003 |
| JP | 2005-39047 A | 2/2005 |
| JP | 2010-78433 A | 4/2010 |
| JP | 2013-010149 | 1/2013 |
| WO | 2010/070915 A1 | 6/2010 |
| WO | 2011/152265 A1 | 12/2011 |

* cited by examiner (RRP)

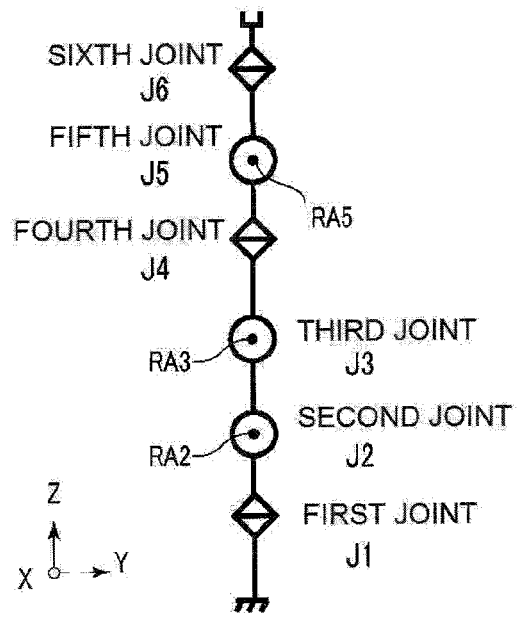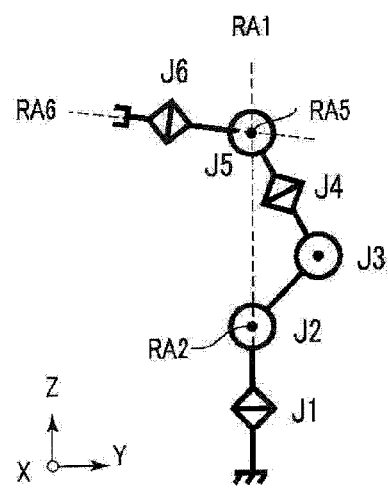
FIG 14A  FIG 14B
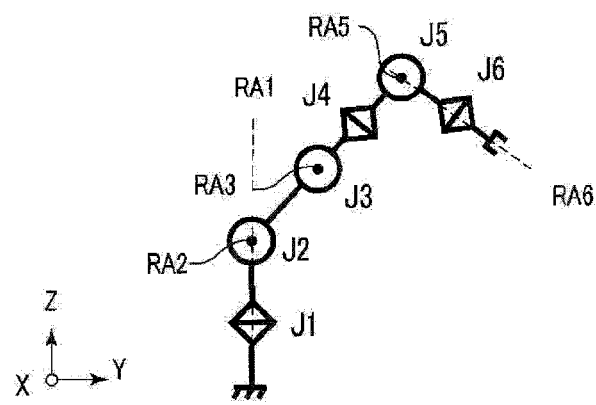
FIG.14C ized by rotational joints J1,
ROBOT ARM MECHANISM

CROSS-REFERENCE TO RELATED APPLICATIONS

This application is continuation application of International Patent Application No. PCT/JP2015/080180 filed on Oct. 27, 2015, which is based upon and claims the benefit of priority from the prior Japanese Patent Application No. 2014-222090, filed Oct. 30, 2014, the entire contents of which are incorporated herein by reference.

FIELD

Embodiments described herein relate generally to a robot arm mechanism.

BACKGROUND

FIG. 13 shows a conventional vertically articulated arm mechanism. The vertically articulated arm mechanism requires three-degree-of-freedom (x, y, z) regarding a position and three-degree-of-freedom ($\varphi$, $\theta$, $\psi$) regarding a posture, which are generally realized by rotational joints J1, J2 and J3 called root three axes and rotational joints J4, J5 and J6 called wrist three axes. For example, a revolute joint is applied to each of joints J1, J4 and J6, and a bending joint is applied to each of joints J2, J3 and J5.

This type of the articulated arm mechanism has singular points in which a degree of freedom in a specific direction is lost despite being within a movable range. The singular point posture causes uncontrollable condition due to countless solutions (sets of joint angles satisfying a certain coordinate position) that exist for a coordinate transformation operation of Cartesian coordinates and sets of joint angles, and causes "out-of-control" because an infinite angular velocity is required for the joint and a movement of the joint becomes rapidly fast in the vicinity of the singular point. Thus, in current situation, the problem is handled by avoiding the singular point or sacrificing a hand movement speed. For example, as the singular point, there is a so-called wrist singular point at which axes of rotation RA1, RA4 and RA6 of the rotational joints J1, J4 and J6 are made coaxial by setting all the bending joints J2, J3 and J5 to zero degree as shown in FIG. 14A; and in this situation, it is impossible to uniquely determine rotation angles of these rotational joints J1, J4 and J6. This situation similarly occurs when at least two rotational joints are aligned in the same axis. As other singular point postures, known are a so-called shoulder singular point at which an intersection point of the axes of rotation RA4, RA5 and RA6 of the joints J4, J5 and J6 of the wrist three axes is located on the axis of rotation RA1 of the rotational joint J1 forming an arm base as shown in FIG. 14B, and a so-called elbow singular point at which an intersection point of the axes of rotation RA4, RA5 and RA6 of the joints J4, J5 and J6 of the wrist three axes is located on a plane including axes of rotation RA2 and RA3 of bending joints J2 and J3 of the root three axes as shown in FIG. 14C.

BRIEF DESCRIPTION OF THE INVENTION

An object of the present invention is to provide a robot arm mechanism capable of structurally eliminating or reducing singular point postures within a movable range.

The robot arm mechanism has a plurality of joints. The first joint is a rotational joint that rotates on a first axis, a second joint is a rotational joint that rotates on a second axis, and a third joint is a linear motion joint that moves along a third axis. The first joint, the second joint and the third joint are arranged in order from a base. The first joint is arranged so that the first axis is perpendicular to the base. The second joint is offset with respect to the first joint in a direction of the first axis and a direction perpendicular to the first axis.

BRIEF DESCRIPTION OF THE DRAWINGS

FIGS. 11A-11P is a diagram illustrating the structure of three wrist axes of the robot arm mechanism according to the present embodiment with symbolic representation;

FIGS. 14A-14C is a diagram illustrating a conventional typical singular point posture.

DETAILED DESCRIPTION OF THE INVENTION

Figure 1:
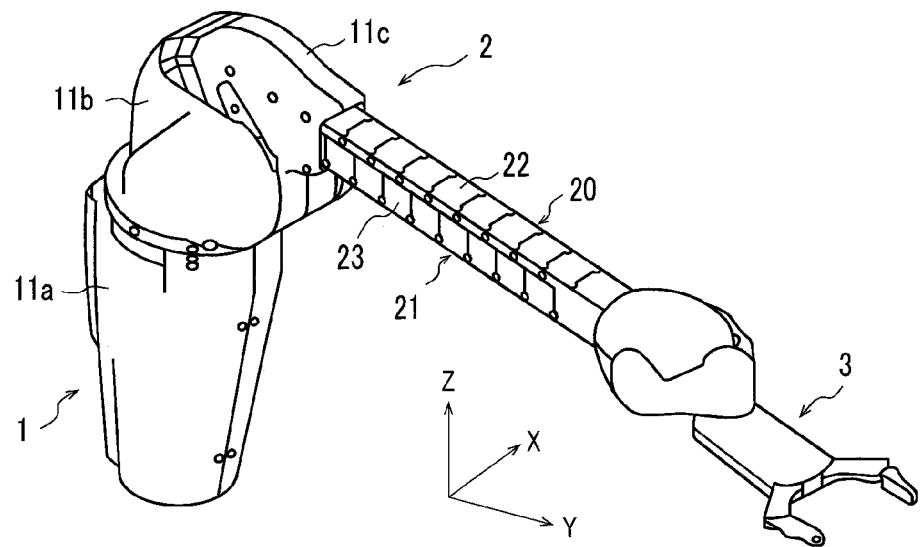
FIG. 1 is an external perspective view of a robot arm mechanism according to the present embodiment.

Hereinafter, a robot arm mechanism according to the present embodiment is described with reference to the accompanying drawings. In the following description, the same reference numerals denote components having substantially identical functions and structures, and the repeated description thereof is made only when necessary.

Figure 2:
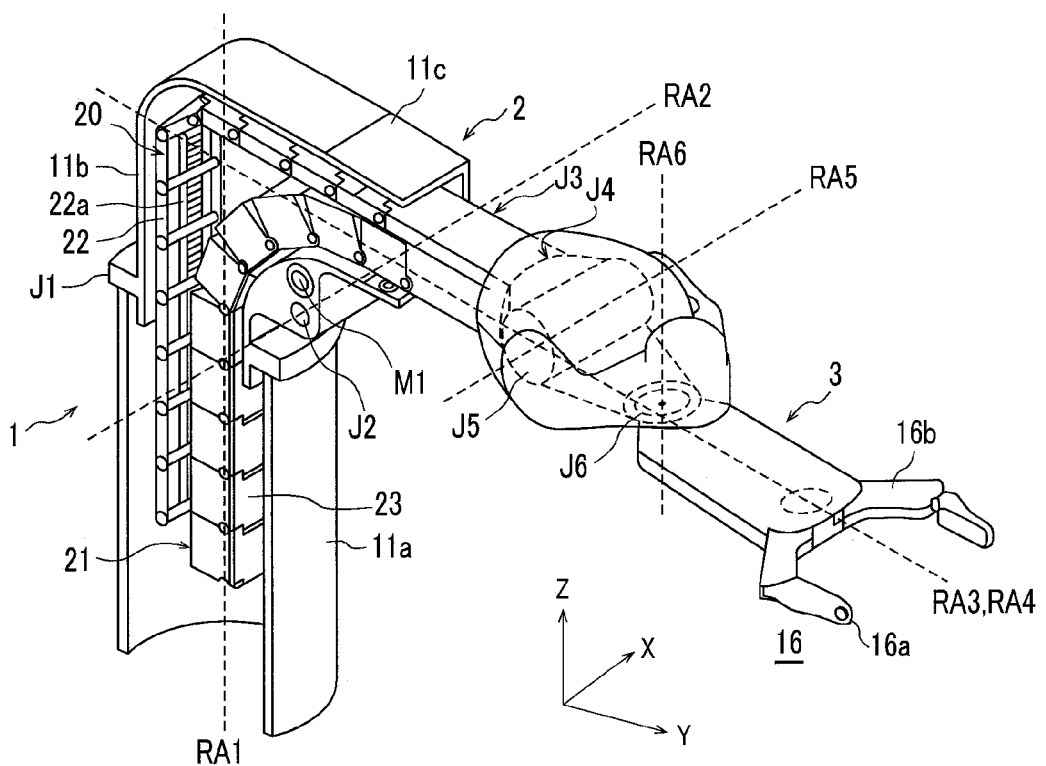
FIG. 2 is a perspective view illustrating an internal structure of the robot arm mechanism in FIG. 1.
Figure 3:
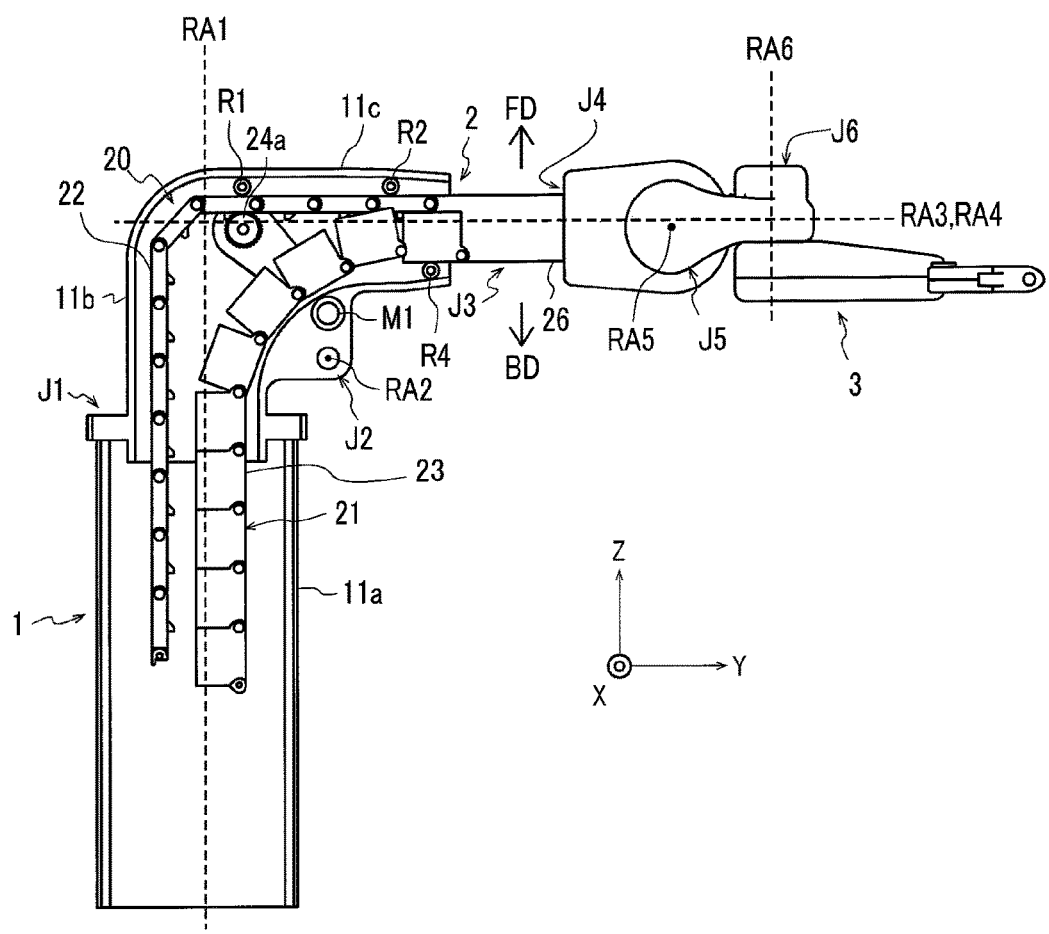
FIG. 3 is a view illustrating the internal structure of the robot arm mechanism in FIG. 1 viewed from a cross-sectional direction.
Figure 4:
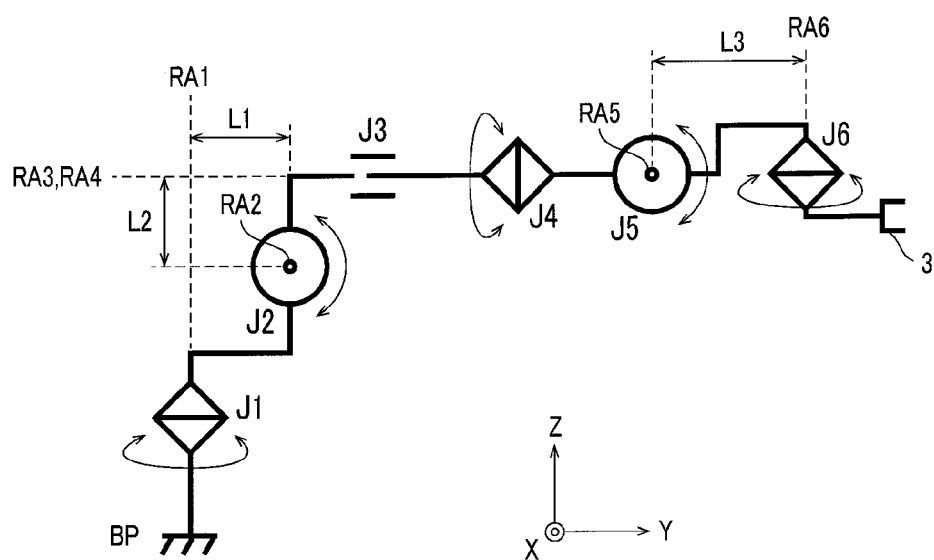
FIG. 4 is a diagram illustrating the robot arm mechanism in FIG. 1 with symbolic representation.

FIG. 1 is an external perspective view of the robot arm mechanism according to the present embodiment. FIG. 2 and FIG. 3 are diagrams illustrating an internal structure of the robot arm mechanism in FIG. 1. FIG. 4 is a diagram illustrating the robot arm mechanism in FIG. 1 with symbolic representation. The robot arm mechanism includes a substantially cylindrical base 1 and an arm section 2 connected to the base 1. A hand end-effector 3 called an end effector is attached to a tip of the robot arm section 2. In FIG. 1, a hand section capable of holding an object is shown as the hand end-effector 3. The hand end-effector 3 is not limited to the hand section, but may be another tool, a camera, or a display. At the tip of the robot arm section 2, an adapter which can be replaced by any type of the hand end-effector 3 may be provided.

The robot arm section 2 includes a plurality (herein, six) of joints J1, J2, J3, J4, J5 and J6. The plurality of the joints J1, J2, J3, J4, J5 and J6 are arranged in order from the base 1. Generally, a first axis RA1, a second axis RA2 and a third axis RA3 are called root three axes, and a fourth axis RA4, a fifth axis RA5 and a sixth axis RA6 are called wrist three axes. At least one of the joints J1, J2 and J3 constituting root three axes is a linear motion joint (prismatic joint). Herein, the third joint J3 is the linear motion joint, particularly a joint with a relatively long extension distance. The first joint J1 is a rotational joint (revolute joint) that rotates on the first axis of rotation RA1 which is held, for example, perpendicularly to a base surface. The second joint J2 is a rotational joint (bending joint) that rotates on the second axis of rotation RA2 perpendicular to the first axis of rotation RA1. The third joint J3 linearly extends or retracts along the third axis (axis of movement) RA3 perpendicular to the second axis of rotation RA2. The fourth joint J4 is a rotational joint (revolute joint) that rotates on the fourth axis of rotation RA4 which matches the third axis of movement RA3. The fifth joint J5 is a bending joint that rotates on the fifth axis of rotation RA5 perpendicular to the fourth axis of rotation RA4. The sixth joint J6 is a bending joint that rotates on the sixth axis of rotation RA6 perpendicular to the fourth axis of rotation RA4 and perpendicular to the fifth axis of rotation RA5.

The arm section 2 turns together with the hand section 3 in accordance with rotation of the first joint J1. The arm section 2 rotates on the second axis of rotation RA2 of the second joint J2 together with the hand section 3 in accordance with rotation of the second joint J2. An arm support body (first support body) 11a forming the base 1 has a cylindrical hollow structure formed around the axis of rotation RA1 of the first joint J1. The first joint J1 is mounted on a fixed base (not shown). When the first joint J1 rotates, the first support body 11a axially rotates together with the turn of the arm section 2. The first support body 11a may be fixed on a ground plane. In this case, the arm section 2 turns independently of the first support body 11a. A second support body 11b is connected to an upper part of the first support body 11a.

The second support body 11b has a hollow structure continuous to the first support body 11a. One end of the second support body 11b is attached to a rotating section of the first joint J1. The other end of the second support body 11b is open, and a third support body 11c is set rotatably on the axis of rotation RA2 of the second joint J2. The third support body 11c has a scaly hollow structure communicating with the first support body 11a and the second support body 11b. In accordance with the bending rotation of the second joint J2, a rear part of the third support body 11c is accommodated in or sent out from the second support body 11b. The rear part of the third joint J3 which constitutes a linear motion joint of the arm section 2 is housed inside the continuous hollow structure of the first support body 11a and the second support body 11b by retraction thereof.

The first joint J1 includes an annular fixed section and a rotating section. The fixed section is fixed on a base (not shown). The first support body 11a and the second support body 11b are attached to the rotating section. When the first joint J1 rotates, the first support body 11a, the second support body 11b and the third support body 11c turn around the first axis of rotation RA1 together with the arm section 2 and the hand section 3.

The third support body 11c is set rotatably, at the lower part of its rear end, on the axis of rotation RA2 with respect to a lower side of an open end of the second support body 11b. In this way, the second joint J2 serving as the bending joint that rotates on the axis of rotation RA2, is formed. When the second joint J2 rotates, the arm section 2 rotates vertically (in other words, rotates upward and downward) on the axis of rotation RA2 of the second joint J2 together with the hand section 3.

As described above, the third joint J3 serving as a joint section constitutes a main constituent of the arm section 2. The hand section 3 described above is provided at the tip of the arm section 2. Rotation, bending, extension and retraction of the first to sixth joints J1-J6 enable positioning two-fingered hand 16 of the hand section 3 at any position and posture. In particular, the linear extension and retraction distance of the third joint J3 enables the hand section 3 to act on an object in a wide range from a position close to the base 1 to a position far from the base 1.

The third joint J3 is characterized by the linear extension and retraction distance realized by a linear extension and retraction arm mechanism constituting the third joint J3. The linear extension and retraction distance is achieved by the structure shown in FIG. 2 and FIG. 3. The linear extension and retraction arm mechanism includes a first connection piece column 21 and a second connection piece column 20. In an alignment pose where the arm section 2 is horizontally positioned, the first connection piece column 21 is located below the second connection piece column 20, and the second connection piece column 20 is located on the top of the first connection piece column 21.

The first connection piece column 21 includes a plurality of first connection pieces 23 having the same U-shaped cross section and connected in a column by pins at their back surface parts. The first connection piece column 21 is bendable in its back surface direction BD but, conversely, not bendable in its front surface direction FD due to the shape of the cross section of the first connection piece 23 and connection positions by the pins. The second connection piece column 20 has a substantially flat plate shape with a width substantially equivalent to that of the first connection piece 23, and includes a plurality of second connection pieces 22 connected in a column by pins in a bendable state in both the back surface direction and the front surface direction. The first connection piece column 21 is joined to the second connection piece column 20 at the tip part by a joining piece 26. The joining piece 26 has an integrated shape of the first connection piece 23 and the second connection piece 22. When the second connection piece column 20 is sent out from the third support body 11c together with the first connection piece column 21 starting with the joining piece 26, the first connection piece column 21 and the second connection piece column 20 are jointed to each other. The first connection piece column 21 and the second connection piece column 20 are joined at their tip parts by the joining piece 26, and are each held in a jointed state at their rear part by being firmly held inside the third support body 11c and prevented from being pulled out. When the first connection piece column 21 and the second connection piece column 20 are held in the jointed state, the bending of the first connection piece column 21 and the second connection piece column 20 is restricted, whereby the first connection piece column 21 and the second connection piece column 20 constitute a columnar body having a certain stiffness. When the first connection piece column 21 and the second connection piece column 20 are separated from each other, the bending restriction is canceled, and the bendable state thereof is restored. The first connection piece column 21 and the second connection piece column 20 are joined in the vicinity of the opening of the third support body 11c and are sent out. The first connection piece column 21 and the second connection piece column 20 are separated from each other in the third support body 11c, and each become bendable. The first connection piece column 21 and the second connection piece column 20 are bent individually and accommodated in the first support body 11a as separate bodies.

As shown in FIG. 2, a linear gear 22a is formed on the inside of each of the second connection pieces 22. The linear gears 22a are connected to form a continuous linear gear when the second connection piece column 20 has a linear shape. As shown in FIG. 3, the second connection piece 22 is sandwiched between a roller R1 and a drive gear 24a inside the third support body 11c. The linear gear 22a is engaged with the drive gear 24a. The second connection piece column 20 is sent out from the third support body 11c together with the first connection piece column 21 by forward rotation of the drive gear 24a by a motor M1. At that time, the first connection piece column 21 and the second connection piece column 20 are sandwiched between a pair of an upper roller R2 and a lower roller R4 provided in the vicinity of the opening of the third support body 11c, are pressed against each other, and are linearly sent out in a joined state along the third axis of movement RA3. The reverse rotation of the drive gear 24a by a motor M1 causes cancellation of the joined state of the second connection piece column 20 and the first connection piece column 21 and separation thereof in the third support body 11c behind the upper roller R2 and the lower roller R4. The separated second connection piece column 20 and first connection piece column 21 restore their bendable state, and are guided by guide rails (not shown) provided inside the second support body 11b and the third support body 11c to be bent in a direction along the first axis of rotation RA1 and housed inside the first support body 11a.

The hand section 3 is provided at the tip of the arm section 2 as shown in FIG. 1. The hand section 3 is moved to a given position by the first joint J1, the second joint J2 and the third joint J3, and is positioned to take a given posture by the fourth joint J4, the fifth joint J5 and the sixth joint J6. The hand section 3 has two fingers 16a and 16b configured to be opened and closed. The fourth joint J4 is a rotational joint (revolute joint) having the axis of rotation RA4 which typically matches a center axis of the arm section 2 along the extension and retraction direction of the arm section 2, that is, the axis of movement RA3 of the third joint J3. When the fourth joint J4 rotates, the hand section 3 rotates on the axis of rotation RA4 from the fourth joint J4 to the tip thereof.

The fifth joint J5 is a bending joint having the axis of rotation RA5 perpendicular to the axis of rotation RA4 of the fourth joint J4. When the fifth joint rotates, the hand section 3 rotates up and down. The sixth joint J6 is a rotational joint (revolute joint) having the axis of rotation RA6 perpendicular to the axis of rotation RA4 of the fourth joint J4 and perpendicular to the axis of rotation RA5 of the fifth joint J5. When the sixth joint J6 rotates, the hand 16 turns left and right.

FIG. 4 is a diagram illustrating the robot arm mechanism in FIG. 1 with symbolic representation. The robot arm mechanism realizes three-degree-of-freedom of position and three-degree-of-freedom of posture by the first joint J1, the second joint J2 and the third joint J3 which constitute the root three axes, and the fourth joint J4, the fifth joint J5 and the sixth joint J6 which constitute the wrist three axes. The first joint J1 is arranged between the first support body 11a and the second support body 11b and is formed as a rotational joint (revolute joint) that rotates on the axis of rotation RA1. The axis of rotation RA1 is perpendicular to a base plane BP of the base on which the fixed section of the first joint J1 is installed. Z axis is defined to be parallel to the axis of rotation RA1. For convenience of description, a space coordinate system (XYZ) of three perpendicular axes which rotates on the Z axis is defined.

The second joint J2 is formed as a bending joint that rotates on the axis of rotation RA2. The axis of rotation RA2 of the second joint J2 is parallel to the X axis in the rotational coordinate system. The axis of rotation RA2 of the second joint J2 is perpendicular to the axis of rotation RA1 of the first joint J1. Furthermore, the second joint J2 is offset with respect to the first joint J1 in two directions including a direction (Z axis direction) of the first axis of rotation RA1 and a Y axis direction perpendicular to the first axis of rotation RA1. A distance between the first joint J1 and the second joint J2 in the Z axis direction, distance between centers of the joints (called a link length or offset distance), is set to d1, and a distance between the first joint J1 and the second joint J2 in the Y axis direction is set to L1. A center of the rotational joint is defined a structure center on an axis of rotation, and a center of the linear motion joint is defined a structure center on an axis of movement.

The second support body 11b is mounted on the first support body 11a in such a manner that the second joint J2 is offset with respect to the first joint J1 in the above two directions. A link part for connecting the second joint J2 to the first joint J1 has a crank shape formed by combining two hook shaped bodies with tips bent into right angles. The link part is constituted by the first support body 11a and the second support body 11b each including hollow structures.

The third joint J3 is formed as a linear motion joint (prismatic joint) that moves along the axis of movement RA3. The axis of movement RA3 of the third joint J3 is perpendicular to the axis of rotation RA2 of the second joint J2. In the alignment pose in which the rotation angle of the second joint J2 is zero degrees; that is, a luffing angle of the arm mechanism 2 is zero degrees, and the arm mechanism 2 is horizontal, the axis of movement RA3 of the third joint J3 is perpendicular to both the axis of rotation RA1 of the first joint J1 and the axis of rotation RA2 of the second joint J2. In the space coordinate system, the axis of movement RA3 of the third joint J3 is arranged to be parallel to the Y axis that is perpendicular to the X axis and the Z axis. Furthermore, the third joint J3 is offset with respect to the second joint J2 in two directions including a direction of the axis of rotation RA2 (Y axis direction) and the Z axis direction perpendicular to the axis of movement RA3. A distance between joints (offset distance) in the Z axis direction between the second joint J2 and the third joint J3 is set to d2, and a distance between joints in the Y axis direction between the second joint J2 and the third joint J3 is set to L2. The third support body 11c is mounted on the second support body 11b in such a manner that the third joint J3 is offset with respect to the second joint J2 in the above two directions. The link part that connects the third joint J3 to the second joint J2 has the hook-shaped body whose tip is vertically bent. The link part is composed of the second support body 11b and the third support body 11c.

The distance L2 in the Y axis direction between the second joint J2 and the third joint J3, and the distance d2 in the Z axis direction between the second joint J2 and the third joint J3 are set to different values.

The fourth joint J4 is constituted as the rotational joint (revolute joint) that rotates on the axis of rotation RA4. The axis of rotation RA4 of the fourth joint J4 is substantially coincident with the axis of movement RA3 of the third joint J3. The fifth joint J5 is constituted as the bending joint rotating on the axis of rotation RA5. The axis of rotation RA5 of the fifth joint J5 is substantially perpendicular to the axis of movement RA3 of the third joint J3 and the axis of rotation RA4 of the fourth joint J4. The sixth joint J6 is constituted as the rotational joint (revolute joint) that rotates on the axis of rotation RA6. The axis of rotation RA6 of the sixth joint J6 is substantially perpendicular to the axis of rotation RA4 of the fourth joint J4 and the axis of rotation RA5 of the fifth joint J5. The sixth joint J6 is arranged to turn the hand section 3 as the hand end-effector and may be constituted as the bending joint whose axis of rotation RA6 is substantially perpendicular to the axis of rotation RA4 of the fourth joint J4 and the axis of rotation RA5 of the fifth joint J5.

In this way, one joint among the three root axes in the plurality of joints J1-J6 is replaced with the linear motion joint, the second joint J2 is offset with respect to the first joint J1 in two directions, and the third joint J3 is offset with respect to the second joint J2 in two directions, and thus, it is possible to realize structural elimination of the singular point posture.

According to the above description, the elimination of the singular point posture or the decrease in the number of singular point postures is realized by the creation of a technical idea of "two adjacent joints in the plurality of joints J1-J6 are arranged to be offset in two or three directions." The creation of the technical idea relates to combinations of the types (revolute joint type, bending joint type and linear motion joint type) of joints of the plurality of joints J1-J6, and there are variations in the direction of the offset according to those combinations. Hereinafter, these variations will be described individually.

Variations of the three root axes and variations of the three wrist axes are individually described. Each variation of the three root axes can be arbitrarily combined individually with respect to the variation of the three wrist axes. For convenience of description on the three root axes, the Z axis is defined to be perpendicular to the base plane of the base, and the space coordinate system (XYZ) of three perpendicular axes rotating on the Z axis is specified. Hereinafter, the description is made in a state of the alignment pose where the rotation angles of all the rotational joints are zero degrees. As distinguishing expression of the variation of the three root axes, a rotational joint (a revolute joint or a bending joint) is expressed by "R" and the linear motion joint (prismatic joint) by "P," and, for example, in a case in which the first and second joints are the rotational joints and the third joint is the linear motion joint, (RRP) is expressed as the first joint, the second joint and the third joint in order from the base. As distinguishing expression of the variation of the three wrist axes, a bending joint is expressed by "B" and a revolute joint is expressed by "R," and, for example, in a case in which the fourth and fifth joints are bending joints and the sixth joint is a revolute joint, (BBR) is expressed as the fourth, fifth, sixth joint in order from the three root axes side.

(Three Root Axes)

Figure 5A:
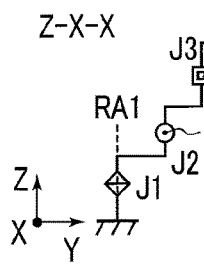
FIGS. 5A-5J is a diagram illustrating the structure (RRP) of three root axes of the robot arm mechanism according to the present embodiment with symbolic representation.
Figure 5B:
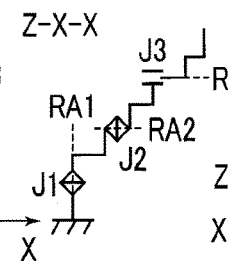

With reference to FIGS. 5A-5J, a pattern (RRP) of the three root axes is described. As shown in FIG. 5A, the first joint J1 and the second joint J2 are the rotational joints R, and the third joint J3 is the linear motion joint P. The first joint J1 is arranged in such a manner that the axis of rotation RA1 thereof is parallel to the Z axis. The second joint J2 is arranged in such a manner that the axis of rotation RA2 thereof is parallel to the X axis. The third joint J3 is arranged in such a manner that the axis of movement RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 5B, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 5C:
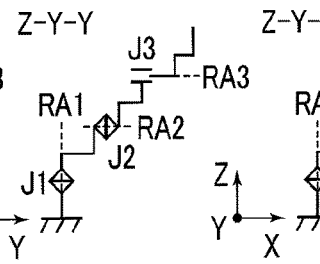
Figure 5D:
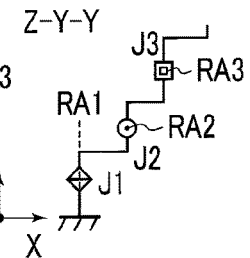

As shown in FIG. 5C, the first joint J1 and the second joint J2 are the rotational joints R, and the third joint J3 is the linear motion joint P. The first joint J1 is arranged in such a manner that the axis of rotation RA1 thereof is parallel to the Z axis. The second joint J2 is arranged in such a manner that the axis of rotation RA2 thereof is parallel to the Y axis. The third joint J3 is arranged in such a manner that the axis of movement RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 5D, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 5E:
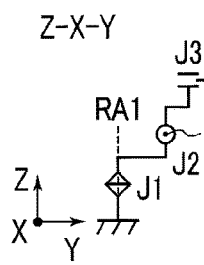
Figure 5F:
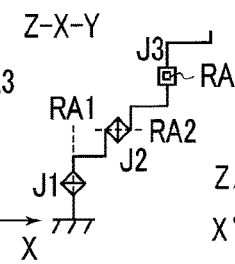

As shown in FIG. 5E, the first joint J1 and the second joint J2 are the rotational joints R, and the third joint J3 is the linear motion joint P. The first joint J1 is arranged in such a manner that the axis of rotation RA1 thereof is parallel to the Z axis. The second joint J2 is arranged in such a manner that the axis of rotation RA2 thereof is parallel to the X axis. The third joint J3 is arranged in such a manner that the axis of movement RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 5F, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 5G:
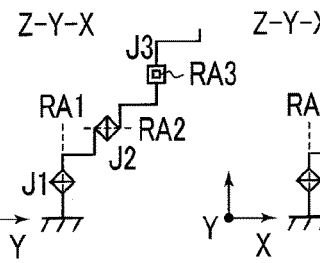
Figure 5H:
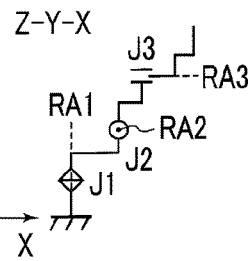

As shown in FIG. 5G, the first joint J1 and the second joint J2 are the rotational joints R, and the third joint J3 is the linear motion joint P. The first joint J1 is arranged in such a manner that the axis of rotation RA1 thereof is parallel to the Z axis. The second joint J2 is arranged in such a manner that the axis of rotation RA2 thereof is parallel to the Y axis. The third joint J3 is arranged in such a manner that the axis of movement RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 5H, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 5I:
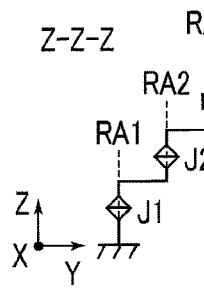
Figure 5J:
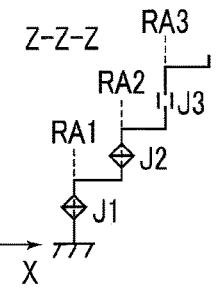

As shown in FIG. 5I, the first joint J1 and the second joint J2 are the rotational joints R, and the third joint J3 is the linear motion joint P. The first joint J1 is arranged in such a manner that the axis of rotation RA1 thereof is parallel to the Z axis. The second joint J2 is arranged in such a manner that the axis of rotation RA2 thereof is parallel to the Z axis. The third joint J3 is arranged in such a manner that the axis of movement RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 5J, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 6A:
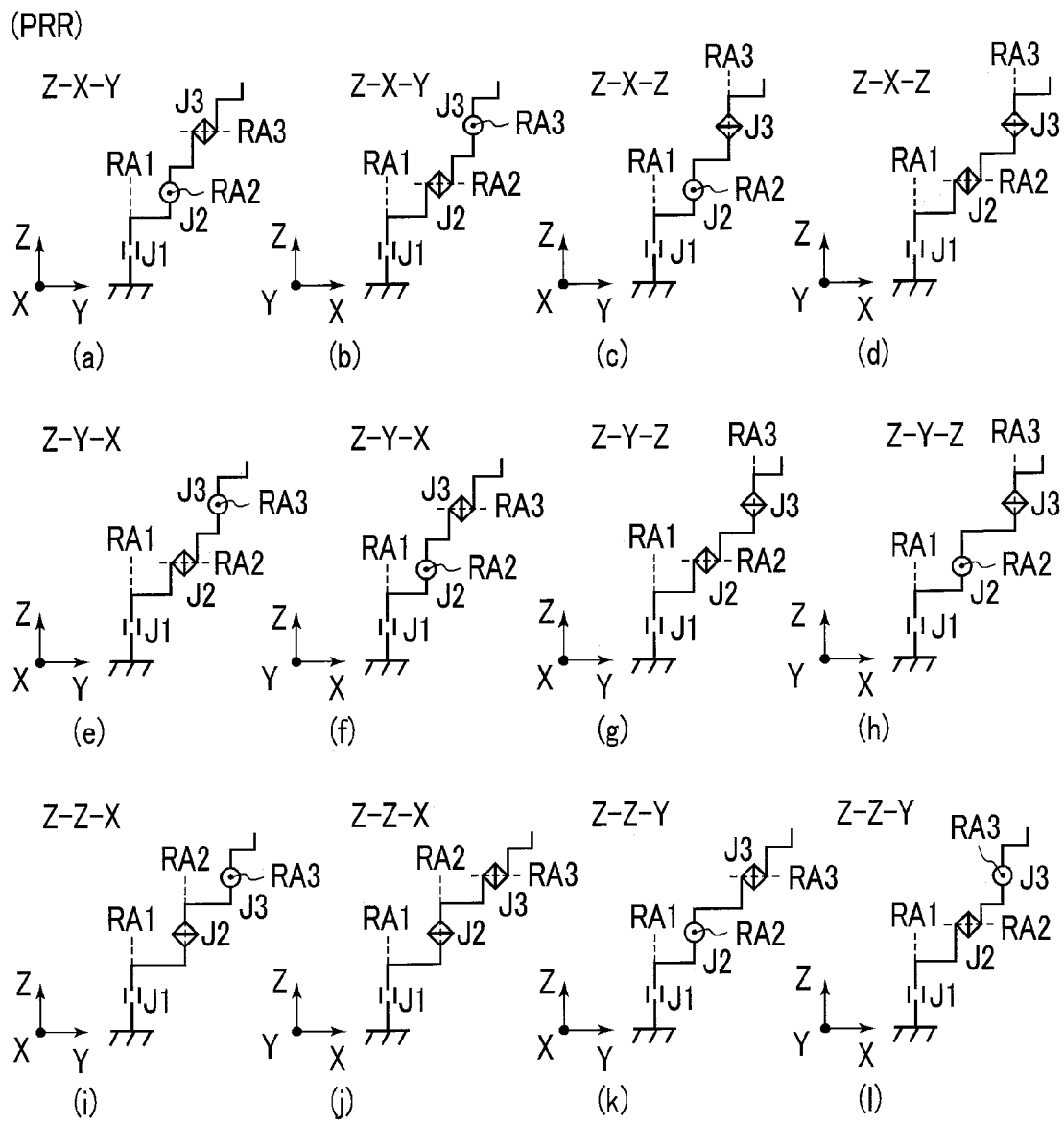
FIG. 6A is a diagram illustrating the structure (PRR) of the three root axes of the robot arm mechanism according to the present embodiment with symbolic representation.
Figure 6B:
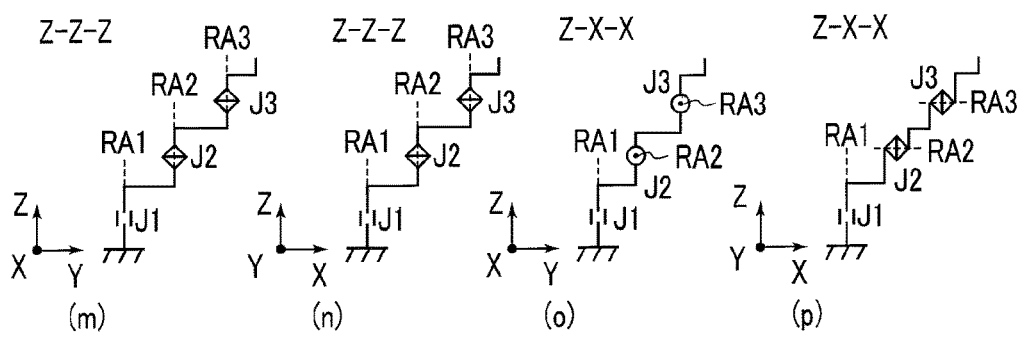
FIG. 6B is a diagram illustrating the structure (PRR) of the three root axes of the robot arm mechanism according to the present embodiment with symbolic representation.
Figure 6B:
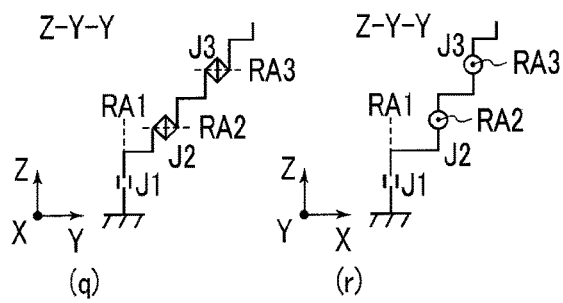

Next, with reference to FIG. 6A and FIG. 6B, (PRR) of the three root axes is described. As shown in FIG. 6A(a), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the X axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(b), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6A(c), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the X axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(d), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6A(e), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the Y axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(f), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6A(g), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the Y axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(h), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6A(i), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the Z axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(j), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6A(k), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the X axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6A(l), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6B(m), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the Z axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6B(n), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6B(o), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the X axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6B(p), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 6B(q), the first joint J1 is the linear motion joint P, and the second joint J2 and the third joint J3 are the rotational joints R. The first joint J1 is arranged in such a manner that the axis of movement RA1 thereof is parallel to the Z axis. The second joint J2 is arranged in such a manner that the axis of rotation RA2 thereof is parallel to the Y axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 6B(r), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 7A:
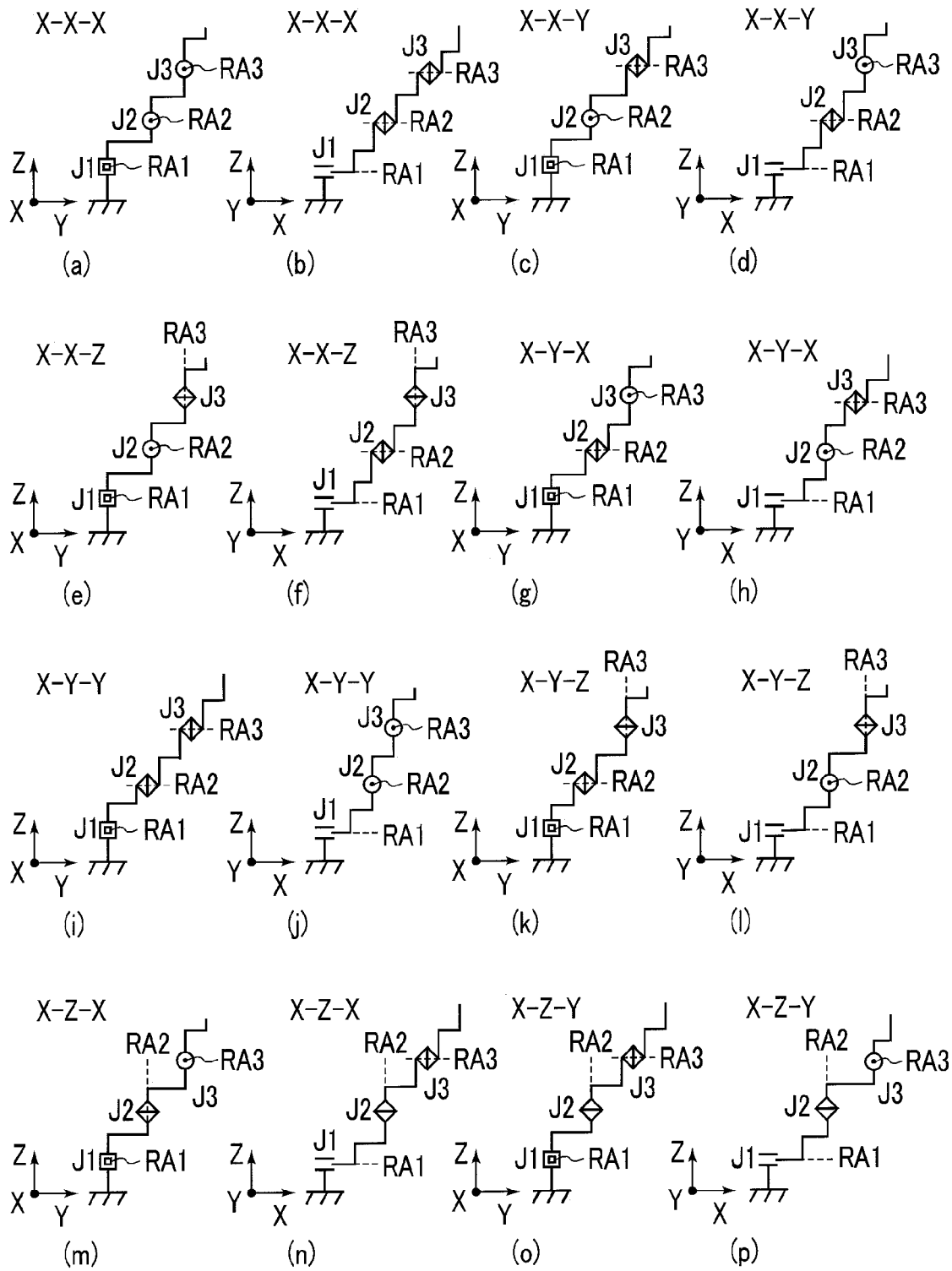
FIG. 7A is a diagram illustrating the structure (PRR) of the three root axes of the robot arm mechanism according to the present embodiment with symbolic representation.
Figure 7B:
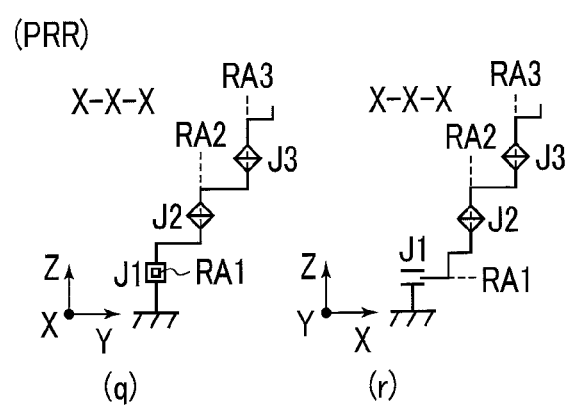
FIG. 7B is a diagram illustrating the structure (PRR) of the three root axes of the robot arm mechanism according to the present embodiment with symbolic representation.

Next, with reference to FIG. 7A and FIG. 7B, in the structure (PRR) of the three root axes, the axis of movement RA1 of the first joint J1 (linear motion joint P) is arranged to be parallel to the X axis is described as an example. As shown in FIG. 7A(a), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the X axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(b), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(c), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the X axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(d), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(e), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the X axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(f), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(g), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Y axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(h), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(i), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Y axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(j), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(k), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Y axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(l), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(m), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Z axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(n), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7A(o), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Z axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7A(p), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 7B(q), the first joint J1 is the linear motion joint P, and the second joint J2 and the third joint J3 are the rotational joints R. The first joint J1 is arranged in such a manner that the axis of movement RA1 thereof is parallel to the X axis. The second joint J2 is arranged in such a manner that the axis of rotation RA2 thereof is parallel to the Z axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 7B(r), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 8A:
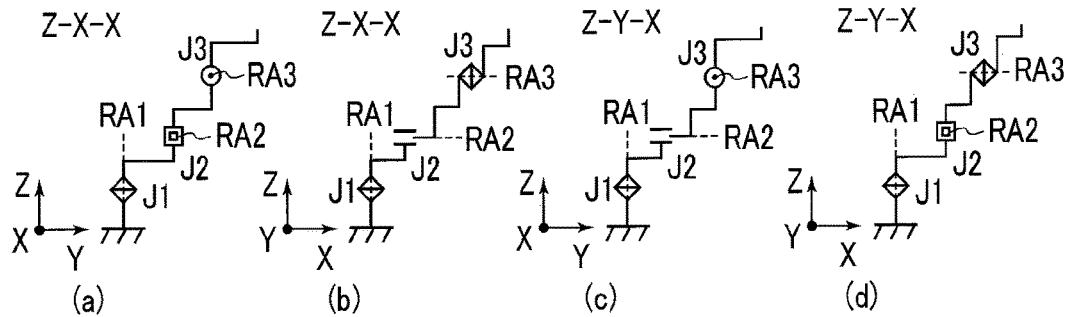
FIG. 8A is a diagram illustrating the structure (RPR) of the three root axes of the robot arm mechanism according to the present embodiment with symbolic representation.
Figure 8A:
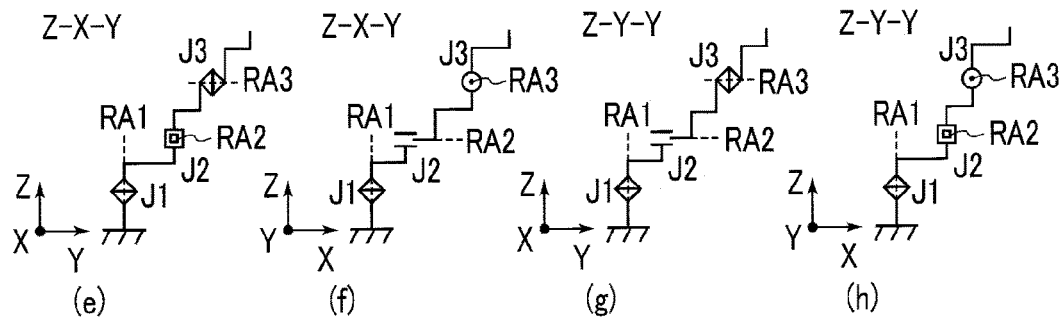
Figure 8A:
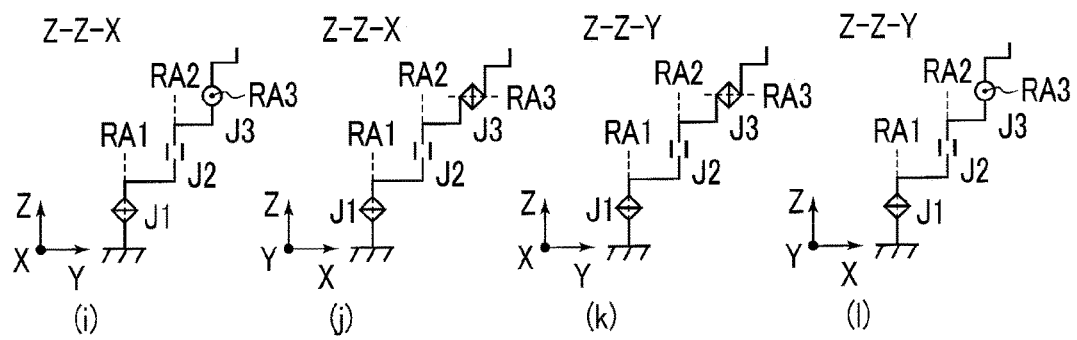
Figure 8A:
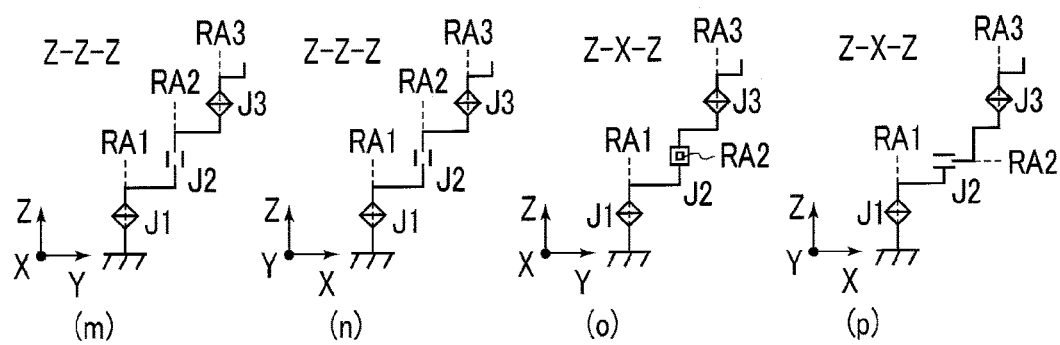
Figure 8B:
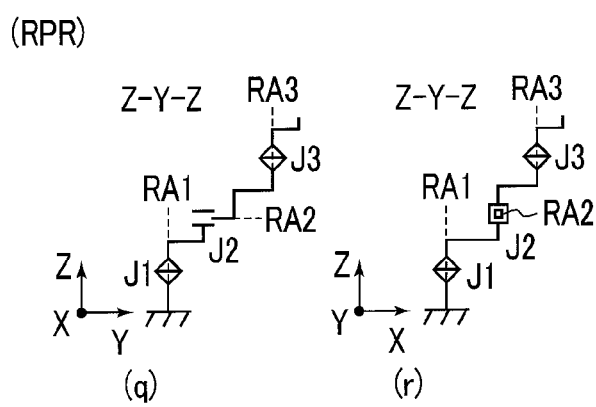
FIG. 8B is a diagram illustrating the structure (RPR) of the three root axes of the robot arm mechanism according to the present embodiment with symbolic representation.

Next, with reference to FIG. 8A and FIG. 8B, (RPR) of the three root axes is described. As shown in FIG. 8A(a), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the X axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(b), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(c), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the Y axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(d), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(e), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the X axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(f), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(g), the first joint J1 and the third joint J3 are the rotational joints R, and the second joint J2 is the linear motion joint (prismatic joint) P. The first joint J1 is arranged in such a manner that the axis of rotation RA1 thereof is parallel to the Z axis. The second joint J2 is arranged in such a manner that the axis of movement RA2 thereof is parallel to the Y axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(h), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(i), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the Z axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(j), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(k), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the Z axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(l), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(m), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the Z axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(n), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8A(o), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the X axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8A(p), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 8B(q), the first joint J1 and the third joint J3 are the rotational joints R, and the second joint J2 is the linear motion joint P. The first joint J1 is arranged in such a manner that the axis of rotation RA1 thereof is parallel to the Z axis. The second joint J2 is arranged in such a manner that the axis of movement RA2 thereof is parallel to the Y axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 8B(r), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 9A:
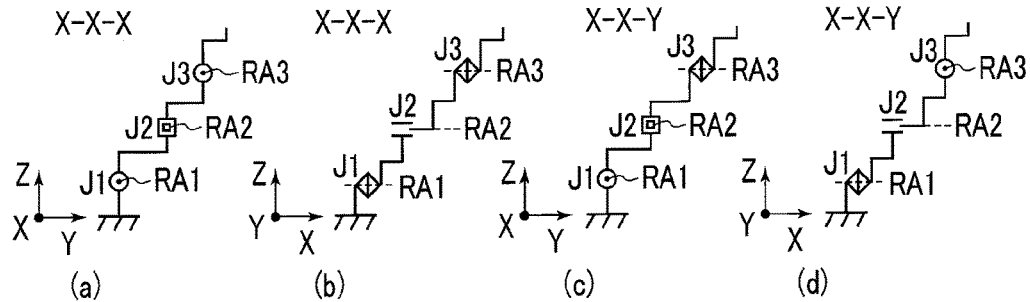
FIG. 9A is a diagram illustrating the structure (RPR) of the three root axes of the robot arm mechanism according to the present embodiment with symbolic representation.
Figure 9A:
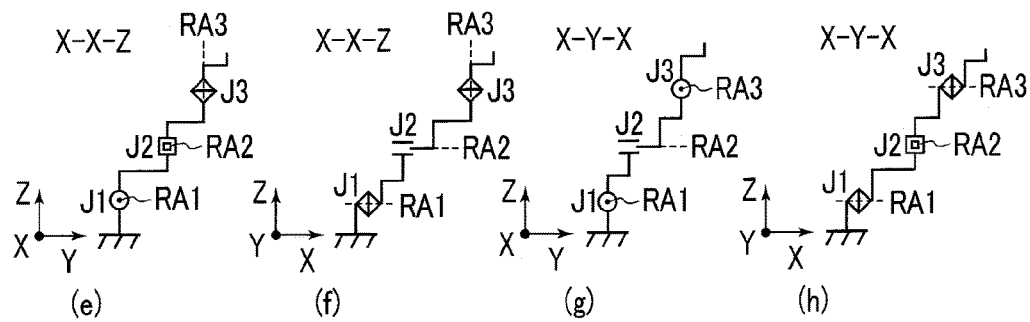
Figure 9A:
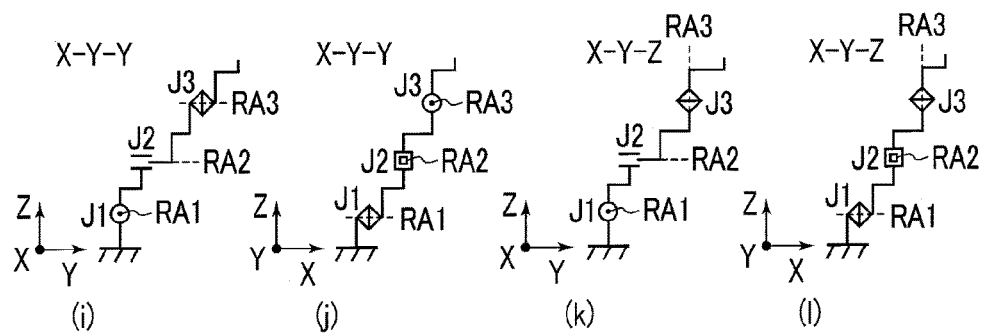
Figure 9A:
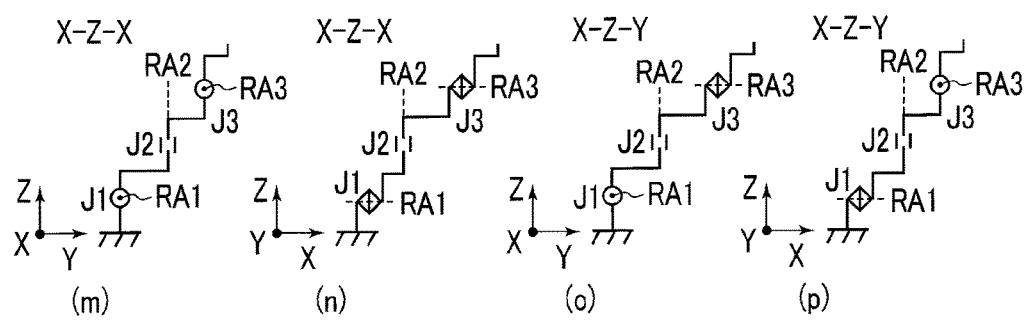
Figure 9B:
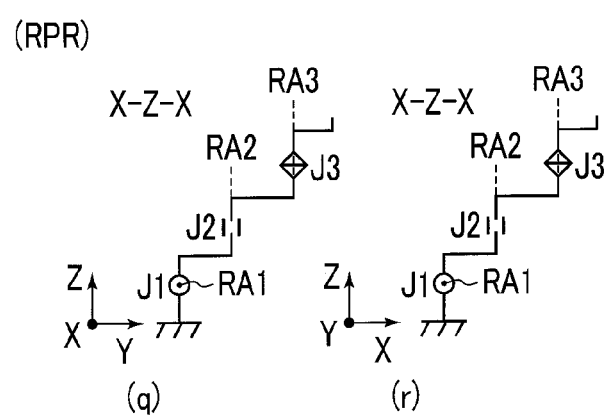
FIG. 9B is a diagram illustrating the structure (RPR) of the three root axes of the robot arm mechanism according to the present embodiment with symbolic representation.

Next, with reference to FIG. 9A and FIG. 9B, (RPR) of the three root axes is described. As shown in FIG. 9A(a), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the X axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(b), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(c), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the X axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(d), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(e), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the X axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(f), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(g), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Y axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(h), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(i), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Y axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(j), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(k), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Y axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(l), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(m), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Z axis. The third joint J3 is arranged in such a manner that the axis of rotation RA3 thereof is parallel to the X axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(n), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9A(o), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Z axis. The third joint J3 is arranged in such a manner that the axis of rotation RA3 thereof is parallel to the Y axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9A(p), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

As shown in FIG. 9B(q), the first joint J1 and the third joint J3 are the rotational joints R, and the second joint J2 is the linear motion joint P. The first joint J1 is arranged in such a manner that the axis of rotation RA1 thereof is parallel to the X axis. The second joint J2 is arranged in such a manner that the axis of movement RA2 thereof is parallel to the Z axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 9B(r), the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 10A:
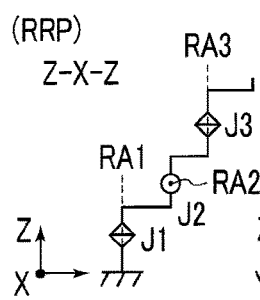
FIGS. 10A-10D is a diagram illustrating the structure (RRR) of the three root axes of the robot arm mechanism according to the present embodiment with symbolic representation.
Figure 10B:
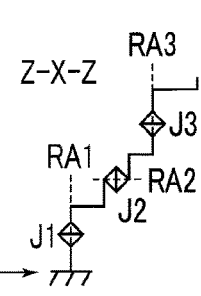

Next, with reference to FIGS. 10A-10D, (RRR) of the three root axes is described. As shown in FIG. 10A, all of the first joint J1, the second joint J2 and the third joint J3 are the rotational joints R. The first joint J1 is arranged in such a manner that the axis of rotation RA1 thereof is parallel to the Z axis. The second joint J2 is arranged in such a manner that the axis of rotation RA2 thereof is parallel to the X axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 10B, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

Figure 10C:
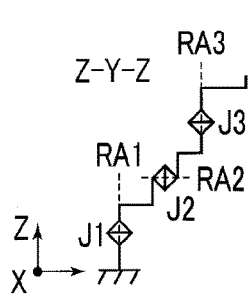
Figure 10D:
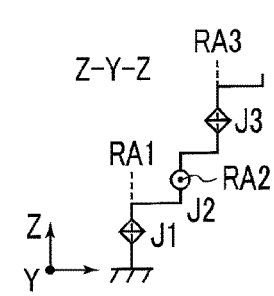

As shown in FIG. 10C, all of the first joint J1, the second joint J2 and the third joint J3 are the rotational joints R. The first joint J1 is arranged in such a manner that the axis of rotation RA1 thereof is parallel to the Z axis. The second joint J2 is arranged in such a manner that the axis of rotation RA2 thereof is parallel to the Y axis. The third joint J3 is arranged in such a manner that the axis of rotation RA3 thereof is parallel to the Z axis. The second joint J2 is offset with respect to the first joint J1 in two directions including the Y axis and the Z axis. The third joint J3 is offset with respect to the second joint J2 in two directions including the Y axis and the Z axis. One of the offset of the second joint J2 with respect to the first joint J1 in the Y axis direction and the offset of the third joint J3 with respect to the second joint J2 in the Y axis direction may be zero. Furthermore, as shown in FIG. 10D, the second joint J2 is also offset with respect to the first joint J1 in the X axis direction. The third joint J3 is also offset with respect to the second joint J2 in the X axis direction. One or both of the offset of the second joint J2 with respect to the first joint J1 in the X axis direction and the offset of the third joint J3 with respect to the second joint J2 in the X axis direction may be zero.

(Three Wrist Axes)

Next, with reference to FIGS. 11A-11P, the three wrist axes are described. As shown in FIG. 11A, all of the fourth joint J4, the fifth joint J5 and the sixth joint J6 are bending joints B (BBB). The fourth joint J4 is arranged in such a manner that the axis of rotation RA4 thereof is parallel to the X axis. The fifth joint J5 is arranged in such a manner that the axis of rotation RA5 thereof is parallel to the X axis. The sixth joint J6 is arranged in such a manner that the axis of rotation RA3 thereof is parallel to the X axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11B, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11C, the fourth joint J4 is the rotational joint R, and the fifth joint J5 and the sixth joint J6 are the bending joints B (RBB). The fourth joint J4 is arranged in such a manner that the axis of rotation RA4 thereof is parallel to the Z axis. The fifth joint J5 is arranged in such a manner that the axis of rotation RA5 thereof is parallel to the X axis. The sixth joint J6 is arranged in such a manner that the axis of rotation RA3 thereof is parallel to the X axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11D, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11E, the fourth joint J4 is the bending joint B, the fifth joint J5 is the rotational joint R, and the sixth joint J6 is the bending joint B (BRB). The fourth joint J4 is arranged in such a manner that the axis of rotation RA4 thereof is parallel to the X axis. The fifth joint J5 is arranged in such a manner that the axis of rotation RA5 thereof is parallel to the Z axis. The sixth joint J6 is arranged in such a manner that the axis of rotation RA3 thereof is parallel to the X axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11F, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11G, the fourth joint J4 is the bending joint B, the fifth joint J5 is the bending joint B, and the sixth joint J6 is the rotational joint R (BBR). The fourth joint J4 is arranged in such a manner that the axis of rotation RA4 thereof is parallel to the X axis. The fifth joint J5 is arranged in such a manner that the axis of rotation RA5 thereof is parallel to the X axis. The sixth joint J6 is arranged in such a manner that the axis of rotation RA3 thereof is parallel to the Z axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11H, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11I the fourth joint J4 is the bending joint B, the fifth joint J5 is the rotational joint R, and the sixth joint J6 is the rotational joint R (BRR). The fourth joint J4 is arranged in such a manner that the axis of rotation RA4 thereof is parallel to the X axis. The fifth joint J5 is arranged in such a manner that the axis of rotation RA5 thereof is parallel to the Z axis. The sixth joint J6 is arranged in such a manner that the axis of rotation RA3 thereof is parallel to the Z axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11J the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11K, the fourth joint J4 is the rotational joint R, the fifth joint J5 is the bending joint B, and the sixth joint J6 is the rotational joint R (RBR). The fourth joint J4 is arranged in such a manner that the axis of rotation RA4 thereof is parallel to the Z axis. The fifth joint J5 is arranged in such a manner that the axis of rotation RA5 thereof is parallel to the X axis. The sixth joint J6 is arranged in such a manner that the axis of rotation RA3 thereof is parallel to the Z axis. The fifth joint J5 is offset with respect to the fourth joint J4 in two directions including the Y axis and the Z axis. The sixth joint J6 is offset with respect to the fifth joint J5 in two directions including the Y axis and the Z axis.

One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11L, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11M, the fourth joint J4 is the rotational joint R, the fifth joint J5 is the rotational joint R, and the sixth joint J6 is the bending joint B (RRB). The fourth joint J4 is arranged in such a manner that the axis of rotation RA4 thereof is parallel to the Z axis. The fifth joint J5 is arranged in such a manner that the axis of rotation RA5 thereof is parallel to the Z axis. The sixth joint J6 is arranged in such a manner that the axis of rotation RA3 thereof is parallel to the X axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11N, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

As shown in FIG. 11O, all of the fourth joint J4, the fifth joint J5 and the sixth joint J6 are the rotational joints R (RRR). The fourth joint J4 is arranged in such a manner that the axis of rotation RA4 thereof is parallel to the Z axis. The fifth joint J5 is arranged in such a manner that the axis of rotation RA5 thereof is parallel to the Z axis. The sixth joint J6 is arranged in such a manner that the axis of rotation RA3 thereof is parallel to the Z axis. The fifth joint J5 is offset with respect to the fourth joint J4 in two directions including the Y axis and the Z axis. The sixth joint J6 is offset with respect to the fifth joint J5 in two directions including the Y axis and the Z axis. One of the offset of the fifth joint J5 with respect to the fourth joint J4 in the Y axis direction and the offset of the sixth joint J6 with respect to the fifth joint J5 in the Y axis direction may be zero. Furthermore, as shown in FIG. 11P, the fifth joint J5 is also offset with respect to the fourth joint J4 in the X axis direction. The sixth joint J6 is also offset with respect to the fifth joint J5 in the X axis direction. One or both of the offset of the fifth joint J5 with respect to the fourth joint J4 in the X axis direction and the offset of the sixth joint J6 with respect to the fifth joint J5 in the X axis direction may be zero.

Figures 12A, 12B:
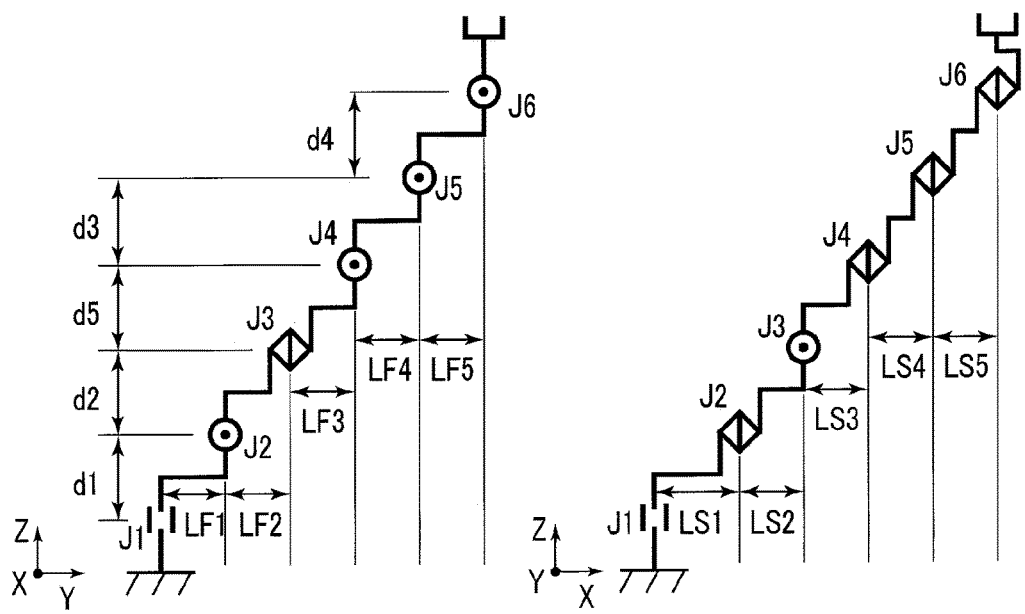
FIGS. 12A-12B is a diagram exemplifying a combination structure of the three root axes and the three wrist axes of the robot arm mechanism according to the present embodiment with symbolic representation.
Figure 13:
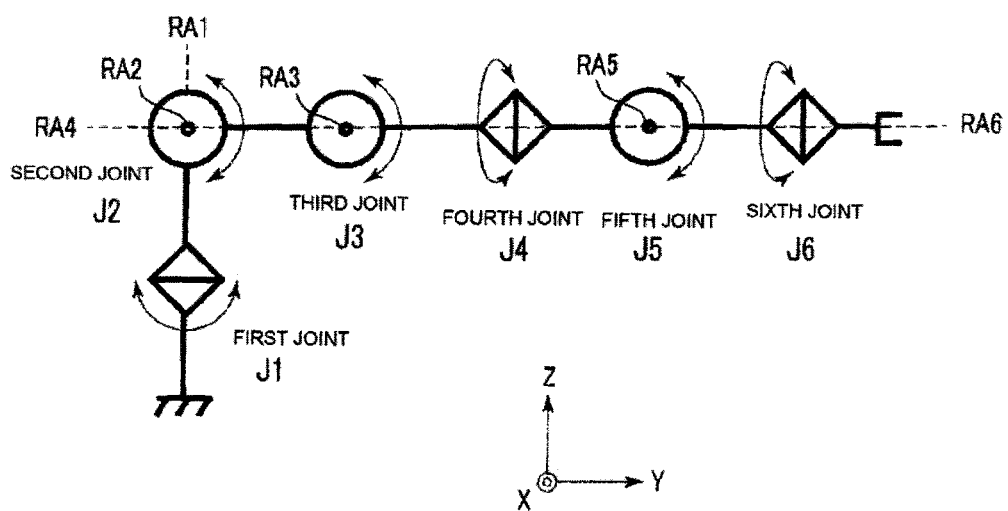
FIG. 13 is a diagram illustrating a conventional typical vertically articulated robot arm mechanism with symbolic representation.

FIG. 12A is a front view illustrating connection of the three root axes (RRR) and the three wrist axes (BBB) as an example of the connection of the three root axes and the three wrist axes. FIG. 12B is a side view illustrating the structure in FIG. 12A. If at least one of an offset distance LF1 of the second joint J2 with respect to the first joint J1 in the Y axis direction, an offset distance LF2 of the third joint J3 with respect to the second joint J2 in the Y axis direction, an offset distance LF3 of the fourth joint J4 with respect to the third joint J3 in the Y axis direction, an offset distance LF4 of the fifth joint J5 with respect to the fourth joint J4 in the Y axis direction, and an offset distance LF5 of the sixth joint J6 with respect to the fifth joint J5 in the Y axis direction, and further, an offset distance LS1 of the second joint J2 with respect to the first joint J1 in the X axis direction, an offset distance LS2 of the third joint J3 with respect to the second joint J2 in the X axis direction, an offset distance LS3 of the fourth joint J4 with respect to the third joint J3 in the X axis direction, an offset distance LS4 of the fifth joint J5 with respect to the fourth joint J4 in the X axis direction, and an offset distance LS5 of the sixth joint J6 with respect to the fifth joint J5 in the X axis direction is not zero, it is possible to eliminate a specific type of the singular point posture.

Furthermore, if at least one of the offset distance LF1 of the second joint J2 with respect to the first joint J1 in the Y axis direction, the offset distance LF2 of the third joint J3 with respect to the second joint J2 in the Y axis direction, the offset distance LF3 of the fourth joint J4 with respect to the third joint J3 in the Y axis direction, the offset distance LF4 of the fifth joint J5 with respect to the fourth joint J4 in the Y axis direction, and the offset distance LF5 of the sixth joint J6 with respect to the fifth joint J5 in the Y axis direction is not zero; and at least one of the offset distance LS1 of the second joint J2 with respect to the first joint J1 in the X axis direction, the offset distance LS2 of the third joint J3 with respect to the second joint J2 in the X axis direction, the offset distance LS3 of the fourth joint J4 with respect to the third joint J3 in the X axis direction, the offset distance LS4 of the fifth joint J5 with respect to the fourth joint J4 in the X axis direction, and the offset distance LS5 of the sixth joint J6 with respect to the fifth joint J5 in the X axis direction is not zero, it is possible to eliminate more types of the singular point postures.

As described above, according to the present embodiment, it is possible to eliminate or reduce the occurrence of various singular point postures within the movable range by taking measures on the structure.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A robot arm mechanism including a plurality of joints, wherein the plurality of joints include a first joint, a second joint, and a third joint, the first joint is a rotational joint that rotates on a first axis, the second joint is a rotational joint that rotates on a second axis perpendicular to the first axis, the third joint is a linear motion joint that moves along a third axis perpendicular to the second axis, the first joint, the second joint and the third joint are arranged in order from a base, the first joint is arranged in such a manner that the first axis is perpendicular to the base, the second joint has three offsets with respect to the first joint along the first axis, the second axis and the third axis, respectively, the third joint has three offsets with respect to the second joint along the first axis, the second axis and the third axis respectively, each of the first, second and third axes does not intersect and is not aligned with any other of the first, second and third axes in any position of the robot arm mechanism, each of the offsets is greater than zero, and an offset direction of the third joint to the second joint is the same as an offset direction of the second joint to first joint, in each of the first, second and third axes.

2. A robot arm mechanism including a plurality of joints, wherein the plurality of joints include a first joint, a second joint, a third joint, a fourth joint, a fifth joint, and a sixth joint, the first joint is a rotational joint that rotates on a first axis, the second joint is a rotational joint that rotates on a second axis perpendicular to the first axis, the third joint is a linear motion joint that moves along a third axis perpendicular to the second axis, the first joint, the second joint and the third joint are arranged in order from a base, the first joint is arranged in such a manner that the first axis is perpendicular to the base, the third joint has three offsets with respect to the first joint along the first axis, the second axis and the third axis respectively, the fourth joint is a rotational joint that rotates on a fourth axis, the fifth joint is a rotational joint that rotates on a fifth axis, the sixth joint is a rotational joint that rotates on a sixth axis, the fourth joint, the fifth joint and the sixth joint are arranged in order following the first joint, the second joint and the third joint from the base, the fifth joint has three offsets with respect to the fourth joint along the fourth axis, the fifth axis and the sixth axis respectively, each of the first, second and third axes does not intersect and is not aligned with any other of the first, second and third axes in any position of the robot arm mechanism, each of the offsets is greater than zero, and an offset direction of the fifth joint to the fourth joint is the same as an offset direction of the sixth joint to fifth joint, in each of the fourth, fifth and sixth axes.

\* \* \* \* \*